US012810618B2

(12) United States Patent
Liu et al.

(10) Patent No.: US 12,810,618 B2
(45) Date of Patent: Nov. 24, 2026

(54) AUTOMATIC ANNOTATION AND SENSOR-REALISTIC DATA GENERATION

(71) Applicant: The Regents of the University of Michigan, Ann Arbor, MI (US)

(72) Inventors: Henry X. Liu, Ann Arbor, MI (US); Rusheng Zhang, Belleville, MI (US); Depu Meng, Ann Arbor, MI (US); Lance Bassett, Ann Arbor, MI (US); Shengyin Shen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 44 days.

(21) Appl. No.: 18/671,081

(22) Filed: May 22, 2024

(65) Prior Publication Data

US 2024/0394944 A1 Nov. 28, 2024

Related U.S. Application Data

(60) Provisional application No. 63/468,235, filed on May 22, 2023.

(51) Int. Cl.
*G06V 20/54* (2022.01)
*G06T 7/20* (2017.01)
(Continued)

(52) U.S. Cl.
CPC ................ *G06V 20/54* (2022.01); *G06T 7/20* (2013.01); *G06T 7/70* (2017.01); *G06T 11/65* (2026.01); *G06T 2207/30241* (2013.01); *G06T 2207/30244* (2013.01)

(58) Field of Classification Search
CPC ... G06T 11/60; G06T 7/70; G06T 7/20; G06T 2207/30241; G06T 2207/30244; G06V 20/54
See application file for complete search history.

(56) References Cited

U.S. PATENT DOCUMENTS

2020/0296558 A1* 9/2020 Adare ................. H04W 68/005
2020/0301799 A1* 9/2020 Manivasagam ......... G01S 7/497
(Continued)

FOREIGN PATENT DOCUMENTS

CN 109613974 B * 3/2022 ............... G06T 7/85
CN 115468778 A * 12/2022 ............... G06T 5/50
WO 2023084205 A1 5/2023

OTHER PUBLICATIONS

International Search Report corresponding to application PCT/US2024/030497, dated Aug. 30, 2024, 4 pages.
(Continued)

*Primary Examiner* — Terrell M Robinson
(74) *Attorney, Agent, or Firm* — Reising Ethington P.C.

(57) ABSTRACT

A data generation system and method for generating sensor-realistic sensor data. The data generation computer system includes: at least one processor, and memory storing computer instructions. The data generation system is, upon execution of the computer instructions by the at least one processor. The method includes: obtaining background sensor data from sensor data of a sensor; augmenting the sensor background data with one or more objects to generate an augmented background sensor output, wherein the augmenting the background sensor data includes determining a two-dimensional (2D) representation of each of the one or more objects based on a pose of the sensor; and generating sensor-realistic augmented sensor data based on the augmented background sensor output through use of a domain transfer network that takes, as input, the augmented background sensor output and generates, as output, the sensor-realistic augmented sensor data.

17 Claims, 8 Drawing Sheets

(51) Int. Cl.
*G06T 7/70* (2017.01)
*G06T 11/65* (2026.01)

(56) References Cited

U.S. PATENT DOCUMENTS

| | | | | |
|---|---|---|---|---|
| 2020/0326203 | A1* | 10/2020 | Lund | G08G 1/04 |
| 2020/0364554 | A1* | 11/2020 | Wang | G06V 20/56 |
| 2021/0207971 | A1* | 7/2021 | Kim | G01C 21/365 |
| 2023/0087476 | A1 | 3/2023 | Liu et al. | |
| 2024/0183752 | A1* | 6/2024 | Hong | G01M 17/007 |

OTHER PUBLICATIONS

Written Opinion corresponding to application PCT/US2024/030497, dated Aug. 30, 2024, 6 pages.

T. Park, A. A. Efros, R. Zhang, and J.-Y. Zhu, "Contrastive learning for unpaired image-to-image translation," in European conference on computer vision. Springer, 2020, pp. 319-345.

M. S. Lee, W. Shin, and S. W. Han, "Tracer: Extreme attention guided salient object tracing network (student abstract)," in Proceedings of the AAAI Conference on Artificial Intelligence, vol. 36, No. 11, 2022, pp. 12 993-12 994.

Z. Ge, S. Liu, F. Wang, Z. Li, and J. Sun, "YOLOX: exceeding YOLO series in 2021," CoRR, vol. abs/2107.08430, 2021.

E. Marchand, H. Uchiyama, and F. Spindler, "Pose estimation for augmented reality: a hands-on survey," IEEE transactions on visualization and computer graphics, vol. 22, No. 12, pp. 2633-2651, 2015.

* cited by examiner

AUTOMATIC ANNOTATION AND SENSOR-REALISTIC DATA GENERATION

STATEMENT OF FEDERALLY SPONSORED RESEARCH

This invention was made with government support under 693JJ32150006 and 69A3551747105 awarded by the Department of Transportation. The government has certain rights in the invention.

TECHNICAL FIELD

The invention relates to vehicle-to-infrastructure (V2I) communications and infrastructure-based perception systems for autonomous driving.

BACKGROUND

With the rapid development in vehicle-to-infrastructure (V2I) communications technologies, infrastructure-based perception systems for autonomous driving has gained popularity. Sensors installed on the roadside of such infrastructure-based perception systems detect vehicles in regions-of-interest in real-time, and forward the perception results to connected automated vehicles (CAVs) with short latency via V2I communications—e.g., via Basic Safety messages (BSMs) defined in Society of Automotive Engineers (SAE) J2735 or Sensor Data Sharing Message defined in SAE J3224. In certain areas, these roadside sensors are installed steadily at a fixed position on the roadside, and are typically installed high above the road, with a more comprehensive view, fewer occluded objects and blind spots, and less environmental diversity than onboard vehicle sensors. Accordingly, roadside perception results can be used to complement the CAV's onboard perception, providing more complete, consistent, and accurate perception of the CAV's environment (referred to as "scene perception"), especially in visually complex and/or quickly changing scenarios, such as those characterized by harsh weather and lighting conditions.

Though it may generally be believed that roadside perception is less complex than onboard perception due to the much lower environmental diversity and fewer occluded objects, roadside perception comes with its unique challenges, with one being data insufficiency, namely, the lack of high-quality, high-diversity labeled roadside sensor data. Obtaining roadside data with sufficiently high diversity (from many sensors deployed from the roadside) is costly compared to onboard perception due to the high installation cost. It is even more costly to obtain large amounts of labeled or annotated data due to the high labor cost. Currently, high-quality labeled or annotated roadside perception data is generally obtained from few locations with limited environmental diversity.

The aforementioned data insufficiency challenge may lead to some noteworthy, realistic issues in real-world deployment. FIGS. 1A-B give examples on some typical cases. In FIG. 1A, the performance of the detector trained on data from one location is heavily impaired when applied to a new location; in FIG. 1B, the training dataset contains no images at night, leading to poor performance at night, even at the same location. These exemplary issues hinder the large-scale deployment of a roadside perception system. On the other hand, as roadside perception is considered a compensating and enhancing method for onboard vehicle detection, the robustness and accuracy requirement for roadside perception may be expected to be higher than onboard perception. The high requirement of roadside perception makes the aforementioned data-insufficiency challenge even more pronounced, at least in certain scenarios.

SUMMARY

In accordance with an aspect of the disclosure, there is provided a method of generating sensor-realistic sensor data. The method includes: obtaining background sensor data from sensor data of a sensor; augmenting the sensor background data with one or more objects to generate an augmented background sensor output, wherein the augmenting the background sensor data includes determining a two-dimensional (2D) representation of each of the one or more objects based on a pose of the sensor; and generating sensor-realistic augmented sensor data based on the augmented background sensor output through use of a domain transfer network that takes, as input, the augmented background sensor output and generates, as output, the sensor-realistic augmented sensor data.

According to various embodiments, this method may further include any one of the following features or any technically-feasible combination of some or all of these features:

- receiving traffic simulation data providing trajectory data for the one or more objects, and determining an orientation and frame position of the one or more objects within the augmented background sensor output based on the trajectory data;
- the augmented background sensor output includes the background sensor data with the one or more objects incorporated therein in a manner that is physically consistent with the background sensor data;
- the orientation and the frame position of each of the one or more objects is determined based on a sensor pose of the sensor, wherein the sensor pose of the sensor is represented by a position and rotation of the sensor, wherein each object of the one or more objects is rendered over and/or incorporated into the background sensor data as a part of the augmented background sensor data output, and wherein the two-dimensional (2D) representation of each object of the objects is determined based on a three-dimensional (3D) model representing the object and the sensor pose;
- the sensor-realistic image data includes photorealistic renderings of one or more graphical objects, each of which is one of the one or more objects;
- the sensor is a camera, and the sensor pose of the camera is determined by a point-n-perspective (PnP) technique;
- homography data is generated as a part of determining the sensor pose of the sensor, and wherein the homography data provides a correspondence between sensor data coordinates within a sensor data frame of the sensor and geographic locations of a real-world environment shown within a field of view (FOV) of the sensor;
- the homography data is used to determine a geographic location of at least one object of the one or more objects based on a frame location of the at least one object;
- the sensor is a camera and at least one of the objects is a graphical object, and wherein the graphical object includes a vehicle and the frame location of the vehicle corresponds to a pixel location of a vehicle bottom center position of the vehicle;

the target sensor is an image sensor, and wherein the sensor-realistic augmented sensor data is photorealistic augmented image data for the image sensor;

the domain transfer network is used for performing an image-to-image translation of image data representing the one or more objects within the augmented background sensor output to sensor-realistic graphical image data representing the one or more objects as one or more sensor-realistic objects according to a target domain;

the target domain is a photorealistic vehicle style domain that is generated by performing a contrastive learning technique on one or more datasets having photorealistic images of vehicles;

the contrastive learning technique is performed on input photorealistic vehicle image data in which portions of images corresponding to depictions of vehicles within the photorealistic images of vehicles of the one or more datasets are excised and the excised portions are used for the contrastive learning technique;

the contrastive learning technique is used to perform unpaired image-to-image translation that maintains structure of the one or more objects and modifies an appearance of the one or more objects according to the photorealistic vehicle style domain;

the contrastive learning technique is a contrastive unpaired translation (CUT) technique;

the domain transfer network is a generative adversarial network (GAN) model that includes a generative network that generates output image data and an adversarial network that evaluates the output image data to determine adversarial loss; and/or the GAN model is used for performing an image-to-image translation of image data representing the one or more objects within the augmented background sensor output to sensor-realistic graphical image data representing the one or more objects as one or more sensor-realistic objects according to a target domain.

In accordance with another aspect of the disclosure, there is provided a data generation computer system. The data generation computer system includes: at least one processor, and memory storing computer instructions. The data generation computer system is, upon execution of the computer instructions by the at least one processor, configured to perform the method discussed above. According to various embodiments, this data generation computer system may further include any of the following features or any technically-feasible combination of some or all of those enumerates features noted above in connection with the method.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

A system and method for generating sensor-realistic sensor data (e.g., photorealistic image data) according to a selected scenario by augmenting sensor background data with physically-realistic objects and then rendering the physically-realistic objects sensor-realistic through use of a domain transfer network, such as one based on a generative adversarial network (GAN) architecture. In embodiments, this includes, for example, augmenting a background image with physically-realistic graphical objects and then rendering the physically-realistic graphical objects photorealistic through use of the domain transfer network. In embodiments, the system includes an augmented reality (AR) generation pipeline that generates augmented image data that represents an augmented image and a reality enhancement (or domain transfer) pipeline that modifies at least a portion of the augmented image in order to make it appear photorealistic (or sensor-realistic), namely the portion of the augmented image corresponding to the physically-realistic objects, such as the portion of augmented image corresponding to the physically-realistic graphical objects. In at least some embodiments, the AR generation pipeline generates physically-realistic graphics of mobile objects, such as vehicles or pedestrians, each according to a determined pose (position and orientation) that is determined based on camera pose information and the background image; and the reality enhancement pipeline then uses the physically-realistic objects (represented as graphics in some embodiments where image data is processed) to generate sensor-realistic data representing the physically-realistic objects as incorporated into the sensor frame along with the background sensor data. According to embodiments, the use of the AR generation pipeline to generate physically-realistic augmented images along with the use of the reality enhancement pipeline to then convert the physically-realistic augmented images to sensor-realistic images enables a wide range of sensor-realistic images to be generated for a wide range of scenarios.

As used herein, the term "sensor-realistic", when used in connection with an image or other data, means that the image or other data appears to originate from actual (captured) sensor readings from an appropriate sensor; for example, in the case of visible light photography, sensor-realistic means photorealistic where the sensor is a digital camera for visible light. In other embodiments, sensor-realistic radar data or lidar data is generated, with this radar or lidar data having recognizable attributes characteristic of data captured using a radar or lidar device. It will be appreciated that, although the illustrated embodiment discusses photorealistic sensor data in connection with a camera, the system and method described below are also applicable to other sensor-based technologies.

Figure 1A:
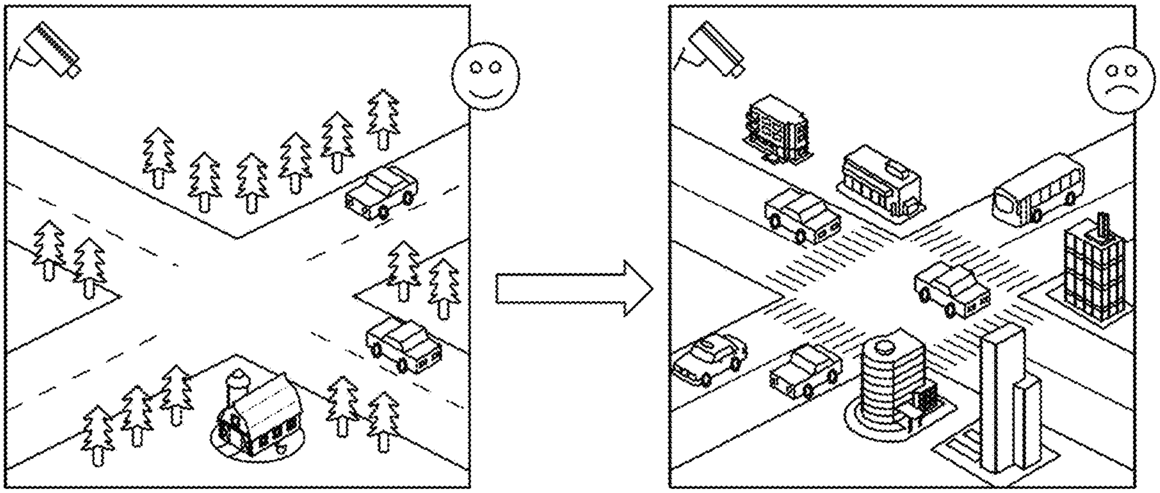
FIG. 1A is a block diagram illustrating a scenario where the performance of a roadside perception detector, trained on data from one specific location, significantly degrades when applied to a different location, highlighting the issue of data insufficiency and lack of environmental diversity in training data, demonstrating a first deficiency of conventional roadside perception systems.
Figure 1B:
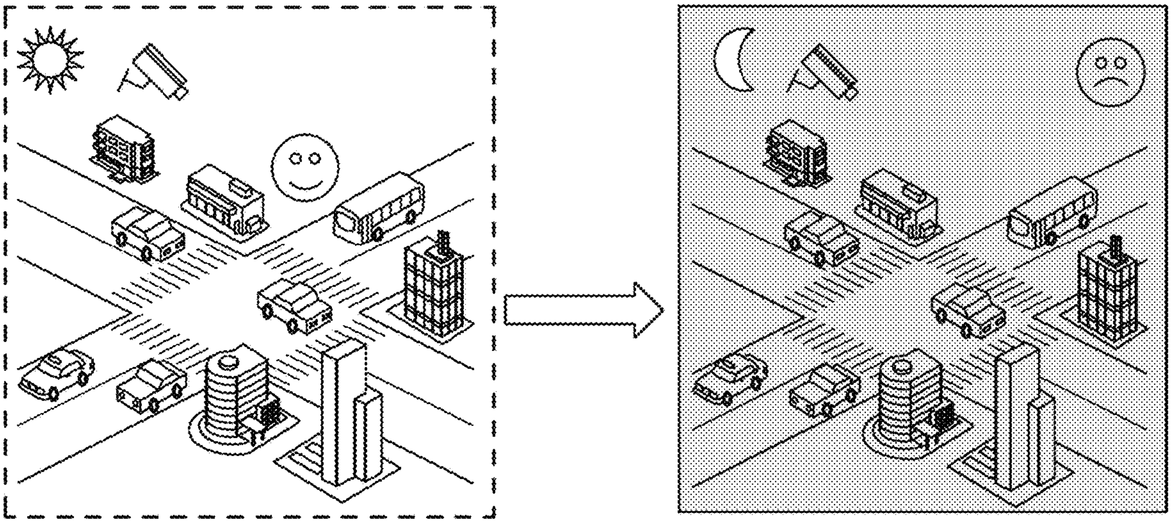
FIG. 1B is a block diagram illustrating a scenario where a roadside perception system trained with a dataset lacking nighttime images performs poorly in night conditions, even at the same location, underscoring the challenge of achieving robust and accurate perception across varying environmental conditions, demonstrating a second deficiency of conventional roadside perception systems.
Figure 2:
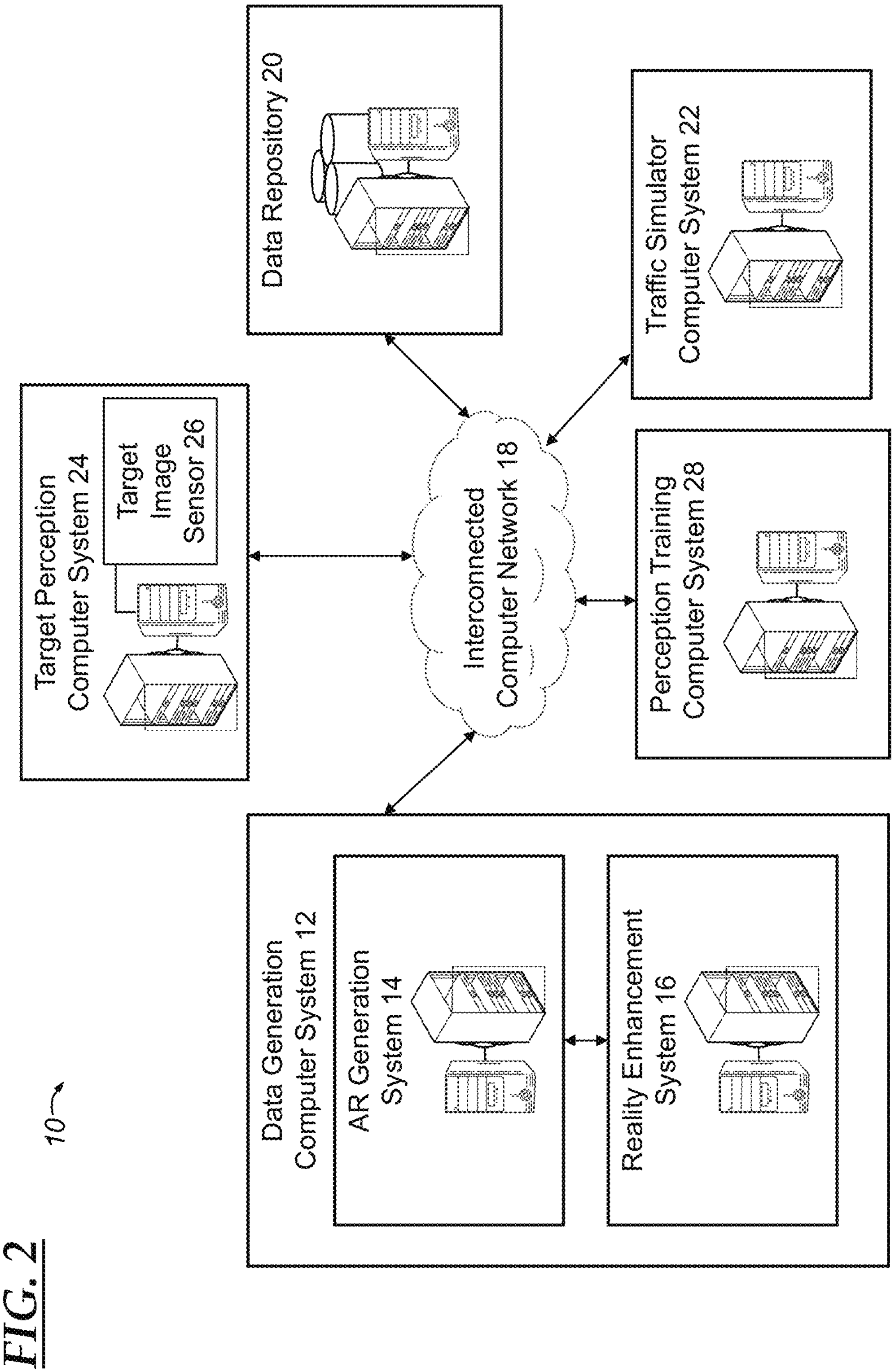
FIG. 2 depicts a communications system that includes a data generation computer system having an augmented reality (AR) generation computer system and a reality enhancement system that is connected to the AR generation computer system, according to one embodiment.

With reference to FIG. 2, there is shown a communications system 10 having a data generation computer system 12, which includes an augmented reality (AR) generation computer system 14 and a reality enhancement system 16 that is connected to the AR generation computer system 14. The data generation computer system 12 is connected to an interconnected computer network 18, such as the internet, that is used to provide data connectivity to other end devices and/or beyond data networks. The communications system 10 further includes a data repository 20, a traffic simulator computer system 22, a target perception computer system 24 having a target image sensor 26, and a perception training computer system 28. Each of the systems 12,22,24,28 is a computer system having at least one processor and memory storing computer instructions accessible by the at least one processor. The AR generation system 14 and the reality enhancement system 16 are each carried out by the at least one processor of the data generation computer system 12. Although the AR generation system 14 and the reality enhancement system 16 are shown as being co-located and locally connected, it will be appreciated that, in other embodiments, the AR generation system 14 and the reality enhancement system 16 may be remotely located and connected via the interconnected computer network 18. Although the systems 12,22,24,28 and repository 20 are shown and described as being separate computer systems connected over the interconnected computer network 18, in other embodiments, two or more of the systems 12,22,24,28 and the repository 20 may be connected via a local computer network and/or may be shared such that the same hardware, such as the at least one processor and/or memory, are shared and used to perform the operations of each of the two or more systems.

The data generation computer system 12 is used to generate data, particularly through one or more of the steps of the methods discussed herein, at least in some embodiments. In particular, the data generation computer system 12 includes the AR generation system 14 and the reality enhancement system 16, at least in the depicted embodiment.

The data repository 20 is used to store data used by the data generation computer system 12, such as background sensor data (e.g., background image data), 3D vehicle model data, 3D model data for other mobile objects (e.g., pedestrians), and/or road map information, such as from OpenStreetMap™. The data repository 20 is connected to the interconnected computer network 18, and data from the data repository 20 may be provided to the data generation computer system 12 via the interconnected computer network 18. In embodiments, data generated by the data generation computer system 12, such as sensor-realistic or photorealistic image data, for example, may be saved or electronically stored in the data repository 20. In other embodiments, the data repository 20 is co-located with the data generation computer system 12 and connected thereto via a local connection. The data repository 20 is any suitable repository for storing data in electronic form, such as through relational databases, no-SQL databases, data lakes, other databases or data stores, etc. The data repository 20 includes non-transitory, computer-readable memory used for storing the data.

The traffic simulation computer system 22 is used to provide traffic simulation data that is generated as a result of a traffic simulation. In embodiments, the traffic simulation is performed to generate realistic vehicle trajectories of the simulated vehicles, which are each represented by heading and location information. This information or data (the traffic simulation data) is used for AR rendering by the AR renderer 108. According to one embodiment, the traffic simulation or generation of the vehicle trajectories is accomplished with Simulation of Urban MObility (SUMO), an open-source microscopic and continuous mobility simulator. In embodiments, road map information may be directly imported to SUMO from a data source, such as OpenStreetMap™, and constant car flows may be respawned for all maneuvers at the intersection. SUMO may only create vehicles at the center of the lane with fixed headings; therefore, a random positional and heading offset may be applied to each vehicle as a domain randomization step. The positional offset follows a normal distribution with a variance of 0.5 meters to both vehicles' longitudinal and latitudinal directions. The heading offset follows a uniform distribution from −5° to 5°. Of course, these are just particulars relevant to the exemplary embodiment described herein employing SUMO, but those skilled in the art will appreciate the applicability of the system and method described herein to embodiments employing other traffic simulation and/or generation platforms or services.

The target perception computer system 24 is a computer system having one or more sensors that are used to capture information about the surrounding environment, which may include one or more roads, for example, when the target perception computer system 24 is a roadside perception computer system. The target perception computer system 24 includes the target image sensor 26 that is used to capture images of the surrounding environment. The target perception computer system 24 is used to obtain sensor data from the target image sensor 26 and to send the sensor data to the data repository 20 where the data may be stored. According to embodiments, the sensor data stored in the data repository 20 may be used for a variety of reasons, such as for generating sensor-realistic or other photorealistic image data as discussed more below and/or for other purposes. In embodiments, the sensor data from the target image sensor 26 is sent from the target perception computer system 24 directly to the data generation computer system 12.

In embodiments, the target perception computer system 24 is a roadside perception computer system that is used to capture sensor data concerning the surrounding environment, and this captured sensor data may be used to inform operation of one or more vehicles and/or road/traffic infrastructure devices, such as traffic signals. In some embodiments, the target perception computer system 24 is used to detect vehicles or other mobile objects, and generates perception result data based on such detections. The perception result data may be transmitted to one or more connected autonomous vehicles (CAVs) using V2I communications, for example; in one embodiment, the target perception computer system 24 includes a short-range wireless communications (SRWC) circuit that is used for transmitting Basic Safety Messages (BSMs) (defined in SAE J2735) and/or Sensor Data Sharing Messages (SDSMs) (defined in SAE J3224) to the CAVs, for example. In embodiments, the target perception computer system 24 uses a YOLOX™ detector; of course, in other embodiments, other suitable object detectors may be used. In one embodiment, the object detector is used to detect a vehicle bottom center position of any vehicles within the input image.

In embodiments, the target image sensor 26 is used for capturing sensor data representing one or more images and this captured image data is used to generate or otherwise obtain background image data (an example of background sensor data) for the target image sensor 26. In embodiments, the target image sensor 26 is a target camera that is used to capture photorealistic images. In other embodiments, the target image sensor 26 is a lidar sensor or a radar sensor that obtains radar data, and this data is considered sensor-realistic as it originates from an actual sensor (the target image sensor 26). The background image is used by the method 300 (FIG. 7) discussed below as a part of generating photorealistic image data. In embodiments, the generated photorealistic image data is used as training data to train the target perception computer system 24 with respect to object detection and/or object trajectory determination; this training may be performed by the perception training computer system 28. In embodiments, the object detector of the target perception computer system 24 is trained using the generated photorealistic image data. This generated photorealistic image data is synthesized data in that this data includes a visual representation of a virtual or computer-generated scene.

The image sensor 26 is a sensor that captures sensor data representing an image; for example, the image sensor 26 may be a digital camera (such as a complementary metal-oxide-semiconductor (CMOS) camera) used to capture sensor data representing a visual representation or depiction of a scene within a field of view (FOV) of the image sensor 26. The image sensor 26 is used to obtain images represented by image data of a roadside environment, and the image data, which represents an image captured by the image sensor 26, may be represented as an array of pixels that specify color information. In other embodiments, the image sensor 26 may each be any of a variety of other image sensors, such as a lidar sensor, radar sensor, thermal sensor, or other suitable image sensor that captures image sensor data. The target perception computer system 24 is connected to the interconnected computer network 18 and may provide image data to the onboard vehicle computer 30. The image sensor 26 may be mounted so as to view various portions of the road, and may be mounted from an elevated location, such as mounted at the top of a street light pole or a traffic signal pole. The image data provides a background image for the target image sensor 26, which is used for generating the photorealistic image data, at least in embodiments. In other embodiments, such as where another type of sensor is used in place of the image sensor, background sensor data is obtained by capturing sensor data of a scene without any of target objects within the scene, where the target objects here refers to those that are to be introduced using the method below.

The perception training computer system 28 is a computer system that is used to train the target perception computer system 24, such as training the object detector of the target perception computer system 24. The training data includes the sensor-realistic sensor (photorealistic image) data that was generated by the data generation computer system 12 and, in embodiments, the training data also includes annotations for the photorealistic image data.

According to one implementation, the training pipeline provided by YOLOX (Z. Ge, S. Liu, F. Wang, Z. Li, and J. Sun, "YOLOX: exceeding YOLO series in 2021," CORR, vol. abs/2107.08430, 2021) is used, but as modified to accommodate the training data used herein, as discussed below. In one particular implementation, YOLOX-Nano™ is used as the default model and the default model is trained for 150 epochs in total with 15 warm-up epochs included, and where the learning rate is dropped by a factor of 10 after 100 epochs, with the initial learning rate is set to be 4e-5 and the weight decay is set to be 5e-4. In embodiments, a suitable optimizer, such as the Adam optimizer, is used. The perception training computer system 28 may use any suitable processor(s) for performing the training, such as an NVIDIA RTX 3090 GPU.

In embodiments, the photorealistic (or sensor-realistic) image data is augmented to resize the image data and/or to make other adjustments, such as flipping the image horizontally or vertically and/or adjusting the hue, saturation, and/or brightness (HSV). For example, the photorealistic image is resized so that the long side is at 640 pixels, and the short side is padded up to 640 pixels; also, for example, random horizontal flips are applied with probability 0.5 and a random HSV augmentation is applied with a gain range of [5, 30, 30]. Of course, other image transformations and/or color adjustments may be made as appropriate. In embodiments, the training data includes the photorealistic image data, which is generated by the data generation computer system 12 and which may be further augmented as previously described.

Any one or more of the electronic processors discussed herein may be implemented as any suitable electronic hardware that is capable of processing computer instructions and may be selected based on the application in which it is to be used. Examples of types of electronic processors that may be used include central processing units (CPUs), graphics processing units (GPUs), field-programmable gate arrays (FPGAs), application specific integrated circuits (ASICs), microprocessors, microcontrollers, etc. Any one or more of the computer-readable memory discussed herein may be implemented as any suitable type of non-transitory memory that is capable of storing data or information in a non-volatile manner and in an electronic form so that the stored data or information is consumable by the electronic processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid-state hybrid drives (SSHDs)), other types of flash memory, hard disk drives (HDDs), non-volatile random access memory (NVRAM), etc. It should be appreciated that the computers or computing devices may include other memory, such as volatile RAM that is used by the electronic processor, and/or may include multiple electronic processors.

Figure 3:
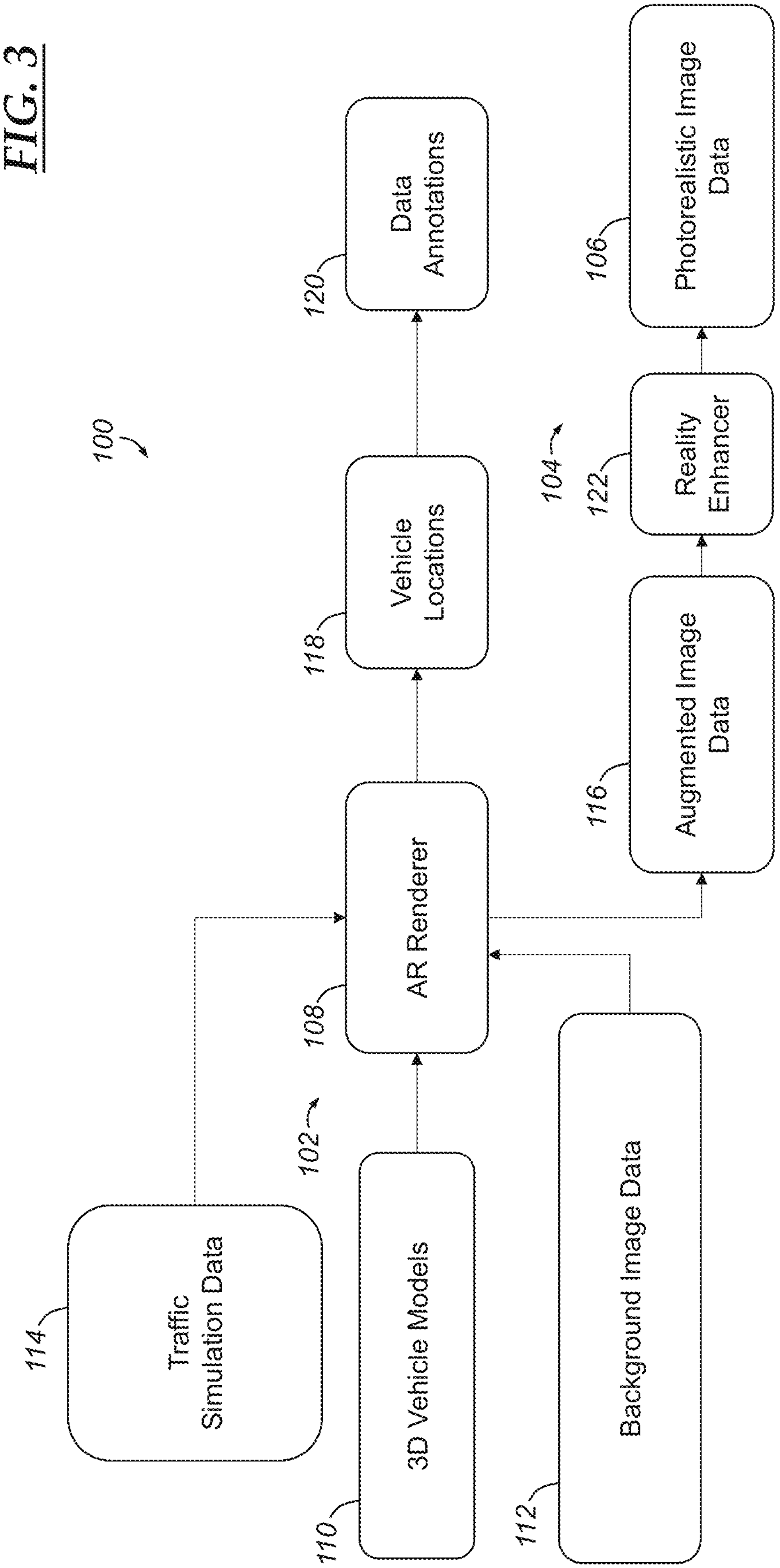
FIG. 3 is a block diagram depicting a photorealistic image data generation system, which includes an AR generation pipeline and a reality enhancement pipeline that are used to generate photorealistic image data, according to one embodiment.
Figure 5:
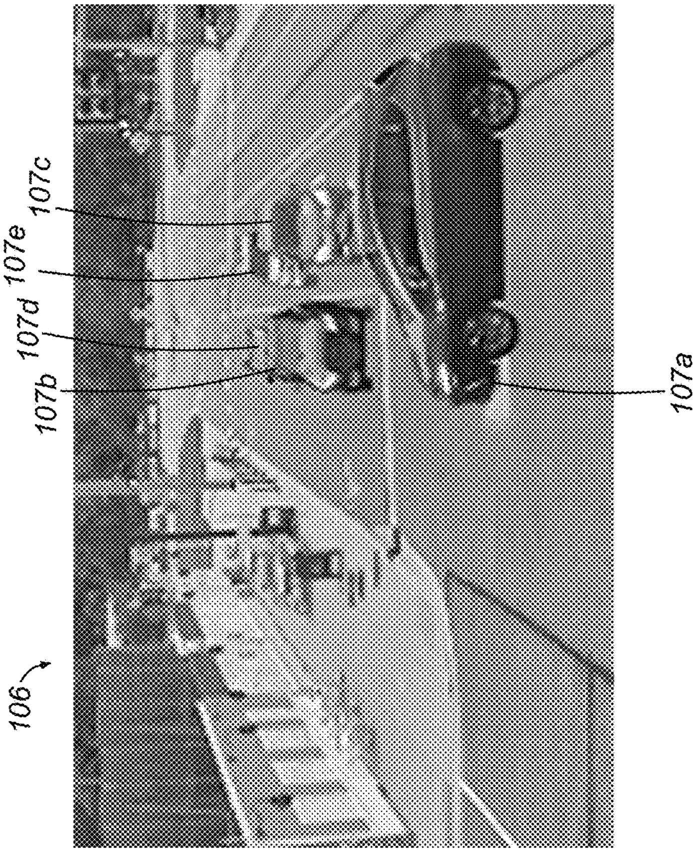
FIG. 5 is an example of a photorealistic image represented by photorealistic image data where the photorealistic image corresponds to the exemplary augmented image of FIG. 4, according to one example and embodiment.
Figure 4:
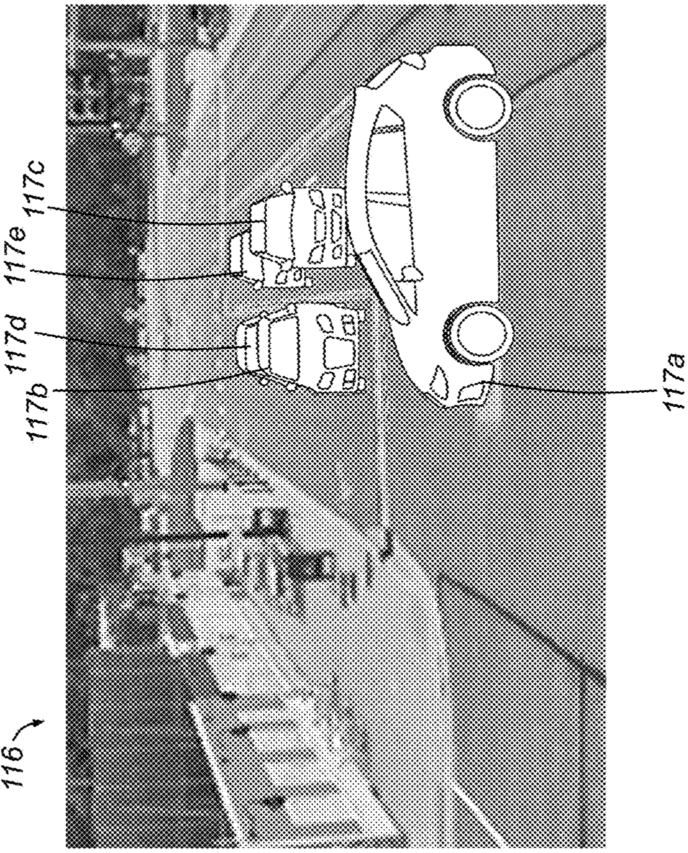
FIG. 4 is an example of an augmented image represented by augmented image data, according to one example and embodiment.

With reference to FIG. 3, there is shown a diagrammatic depiction of a photorealistic image data generation system 100 having an augmented reality (AR) generation pipeline 102 and a reality enhancement pipeline 104 that are used to generate photorealistic image data 106. The photorealistic image data generation system 100 is implemented by the data generation computer system 12, with the AR generation system 14 and the reality enhancement system 16 corresponding to the AR generation pipeline 102 and the reality enhancement pipeline 104, respectively. In particular, at least in embodiments including the depicted embodiment, the AR generation pipeline 102 includes an AR renderer 108 that takes three-dimensional (3D) vehicle model data 110, background images 112, and traffic simulation data 114 as input and generates, as output, augmented image data 116 and vehicle location data 118 that may be used as or for generating data annotations 120, and the reality enhancement pipeline 104 includes a reality enhancer 122, which takes, as input, the augmented image data 116 and generates, as output, the photorealistic image data 106. The augmented image data 116 according to the present example is reproduced in FIG. 4 and the photorealistic image data 106 according to the present example is reproduced in FIG. 5. For example, the graphical objects 117*a-c*, each of which is a passenger vehicle, are shown in the augmented image data 116 as being plain objects that are physically-positioned accurately provided the scene (background image), but appear fake as the style or detail in appearance is lacking and mismatched to the background image. As shown in the photorealistic image data 106 of FIG. 5, the graphical objects are rendered to be photorealistic representations 107*a-e* of the graphical objects 117*a-e* as depicted in the augmented image data. It will be appreciated that the photorealistic image data generation system 100 represents one such exemplary embodiment and that the photorealistic image data generation system 100 may include one or more other components and/or may exclude one or more of the components shown and described in FIG. 3, according to embodiments.

The AR renderer 108 is used to generate the augmented image data 116 using the 3D vehicle model data 110, the background image data 112, and the traffic simulation data 114. The vehicle model data 110 may be 3D vehicle models obtained from a data repository, such as the Shapenet™ repository, which is a richly-annotated, large-scale dataset of 3D shapes. A predetermined number of 3D vehicle models may be selected and, in embodiments, many, such as 200, are selected to yield a diverse model set. For each vehicle in SUMO simulation, a random model may be assigned and rendered onto background images. As discussed above, the traffic simulation data 114 may be data representing vehicle heading information, which indicates a vehicle's location and heading (orientation). In other embodiments, other trajectory information may be used and received as the traffic simulation data 114.

The background image data 112 is data representing background images. The background images each may be used as a backdrop or background layer upon which AR graphics are rendered. The background images are used to provide a visual two dimensional representation of a region within a field of view of a camera, such as one installed as a part of a roadside unit and that faces a road. The region, which may include portions of one or more roads, for example, may be depicted in the background image in a static and/or empty state such that the background image depicts the region without mobile objects that pass through the region and/or other objects that normally are not within the region. The background images can be easily estimated with a temporal median filter, such as taught by R. C. Gonzalez, *Digital image processing*. Pearson Education India, 2009. The temporal median filter is one example of a way in which the background image is estimated, as other methods include, for example, Gaussian Mixture Model methods, Filter-based method and machine learning-based methods. Background image data representing a background image under different conditions may be generated and/or otherwise obtained in order to cover the variability of the background for each camera (e.g., different weather conditions, different lighting conditions).

The augmented image data 116 includes data representing an augmented image that is generated by overlaying one or more graphical objects on the background image. In embodiments, at least one of the graphical objects is a vehicle whose appearance is determined based on a camera pose (e.g., an estimated camera pose as discussed below) and vehicle trajectory data (e.g., location and heading). The augmented image data 116 is then input into the reality enhancer 122.

The reality enhancer 122 generates the sensor-realistic image data 106 (by executing a GAN model in the present embodiment) that takes the augmented image data 116 as input. This image data 106, which may be photorealistic image data, is a modified version of the augmented image data in which portions corresponding to the graphical objects are modified in order to introduce shading, lighting, other details, and/or other effects for purposes of transforming the graphical objects (which may be initially rendered by the AR renderer 108 using a 3D model) into photorealistic (or sensor-realistic) representations of those objects. In embodiments, the photorealistic (or sensor-realistic) representations of those graphical objects may be generated so as to match the background image so that the lighting, shading, and other properties match those of the background image.

The AR renderer 108 also generates the vehicle location data 118, which is then used for generating data annotations 120. The data annotations 120 represent labels or annotations for the photorealistic image data 106. In the depicted embodiment, the data annotations 120 are based on the vehicle location data 118 and represent labels or annotations of vehicle location and heading; however, in other embodiments, the data annotations may represent labels or annotations of other vehicle trajectory or positioning data; further, in embodiments, other mobile objects may be rendered as graphical objects used as a part of the photorealistic image data 106 and the data annotations may represent trajectory and/or positioning data of these other mobile objects, such as pedestrians.

Those skilled in the art will appreciate that the previous discussion of the photorealistic image data generation system 100 is applicable to generate sensor-realistic augmented sensor data, such as for a lidar sensor or a radar sensor, for example.

Figure 6:
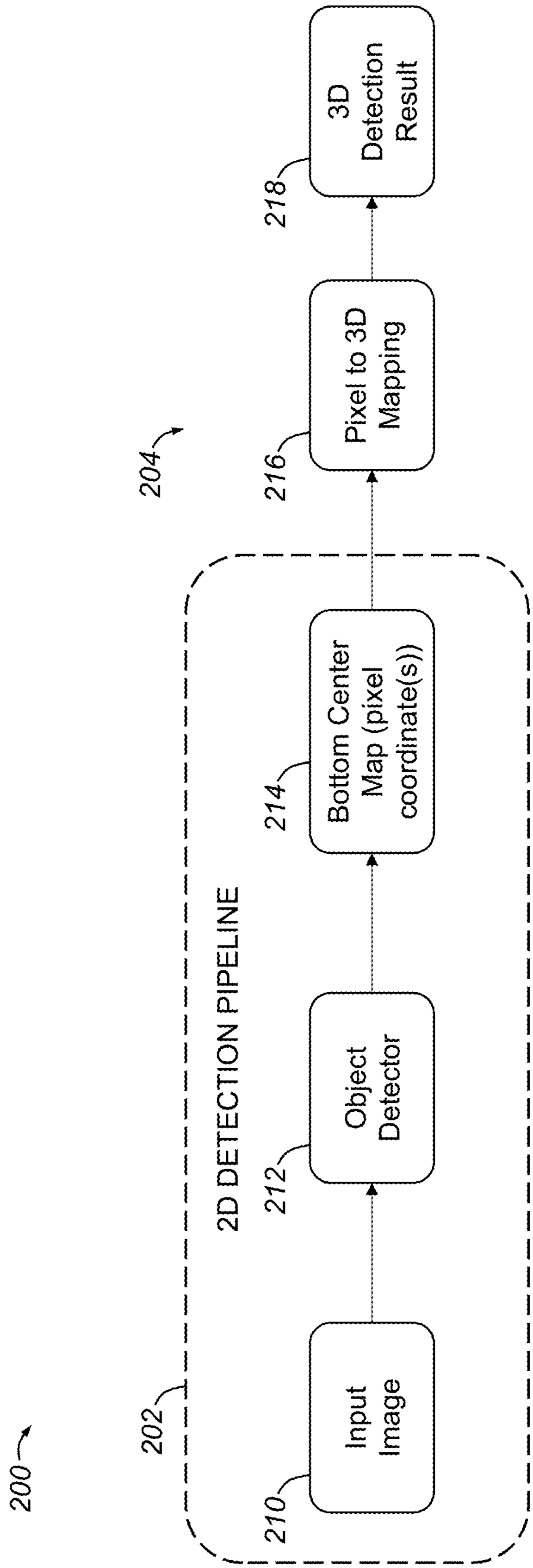
FIG. 6 is a block diagram and flowchart depicting a three dimensional (3D) detection pipeline that includes a two dimensional (2D) detection pipeline and a 2D-pixel-to-3D detection pipeline, according to one embodiment.

With reference to FIG. 6, there is shown a diagrammatic depiction of a three dimensional (3D) detection pipeline 200 that includes a two dimensional (2D) detection pipeline 202 and a 2D-pixel-to-3D detection pipeline 204. The 2D detection pipeline 202 begins with an input image 210, which may be a generated sensor-realistic image (e.g., photorealistic image data 106) using the method 300 discussed below, for example. At operation 212, the 2D detection pipeline 202 uses an object detector, such as the object detector of the target perception computer system 24, to detect a vehicle bottom center position that is specified as a pixel coordinate location (or a frame location (analogous to a pixel coordinate location in that the frame location specifies a location relative to a sensor data frame, which represents the extent of sensor data captured at a given time)). In embodiments, the object detector is trained to detect vehicle bottom center positions and, for example, may be a YOLOX™ detector. As shown at operation 214, the object detector outputs detection results as a bottom center map that specifies pixel coordinate locations of a vehicle bottom center for one or more vehicles detected. The 2D detection pipeline 202 then provides the bottom center map to the 2D-pixel-to-3D detection pipeline 204, which performs a pixel to 3D mapping as indicated at operation 216. The pixel to 3D mapping uses homography data, such as a homography matrix, to determine correspondence between pixel coordinates in images of a target sensor (e.g., camera) and geographic locations in the real world environment within the FOV of the target camera, which may be used to determine 3D locations or positions (since geographic elevation values may be known for each latitude, longitude pair of Earth). In embodiments, the homography data generated is the same data as (or derived from) the homography data used for determining the camera pose, which may be determined through use of a perspective-n-point (PnP) technique, for example.

Figure 7:
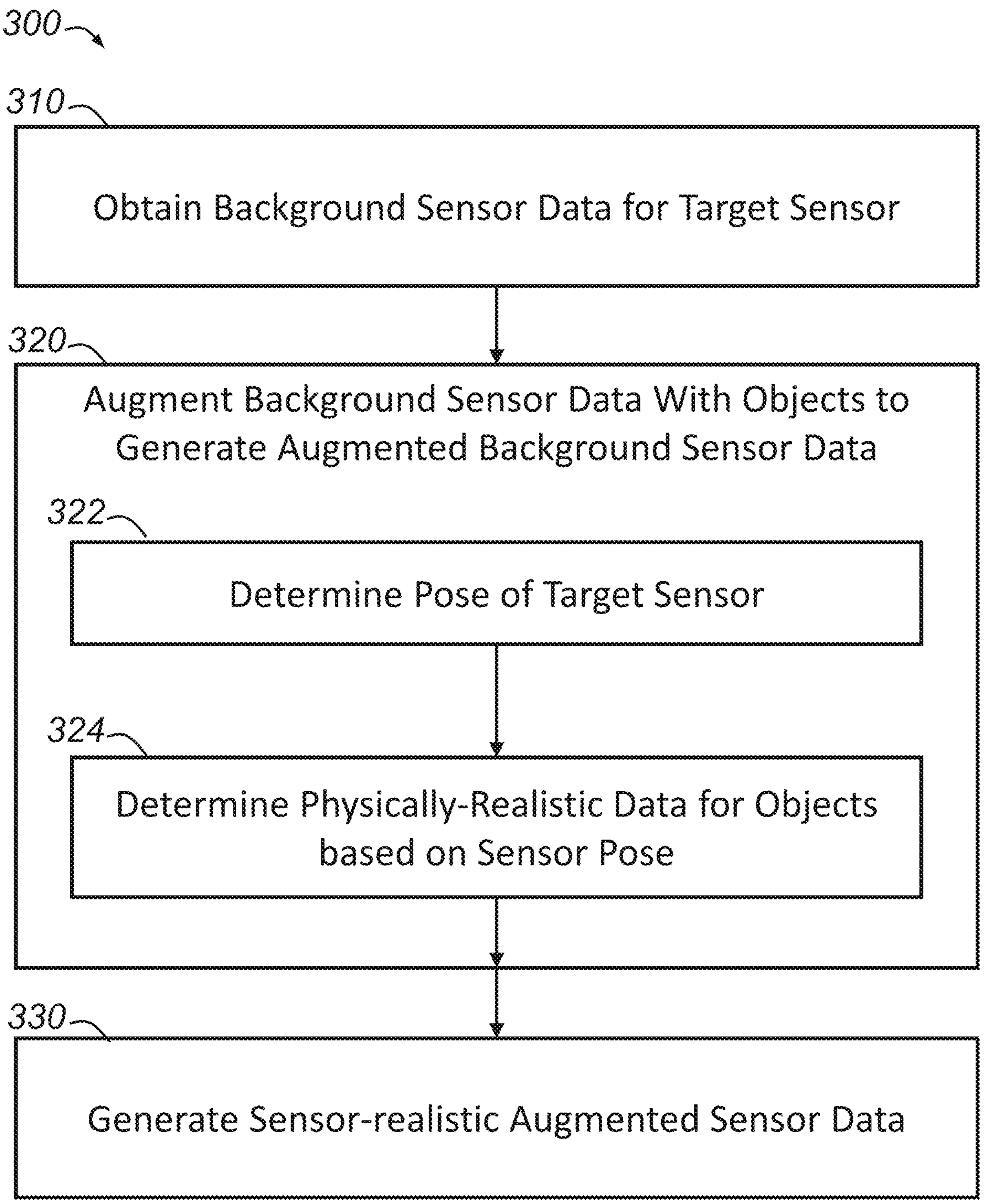
FIG. 7 is a flowchart of a method of generating sensor-realistic sensor data, according to one embodiment.

With reference to FIG. 7, there is shown a method 300 of generating sensor-realistic sensor data and, more particularly, photorealistic image data. In embodiments, the method is carried out by an at least one processor and memory storing computer instructions accessible by the at least one processor. For example, in one embodiment, the data generation computer system 12 is used to generate the photorealistic image data; in embodiments, the AR generation system 14 is used to generate an augmented image (augmented image data) and, then, the reality enhancement system 16 generates the photorealistic image (the photorealistic image data) based on the augmented image data. It will be appreciated that the steps of the method 300 may be carried out in any technically-feasible order.

In embodiments, the method 300 is used as a method of generating photorealistic image data for a target camera. The photorealistic image is generated using background image data derived from sensor data captured by the target image sensor 26, which is the target camera in the present embodiment. The photorealistic image data generated using the method 300 may, thus, provide photorealistic images that depict the region or environment (within the field of view of the target camera) under a variety of conditions (e.g., light conditions, weather conditions) and scenarios (e.g., presence of vehicles, position and orientation of vehicles, presence and attributes of other mobile objects).

The method 300 begins with step 310, wherein background sensor data for a target sensor is obtained and, in embodiments where the target sensor is a camera, for example, a background image for the target camera is obtained. The background image is represented by background image data and, at least in embodiments, the background image data is obtained from captured sensor data from the target camera, such as the target image sensor 26. The background image may be determined using a background estimation that is based on temporal median filtering of a set of captured images of the target camera. The background image data may be stored at the data repository 20 and may be obtained by the AR generation system 14 of the data generation computer system 12, such as by having the background image data being electronically transmitted via the interconnected computer network 18. The method 300 continues to step 320.

In step 320, the background sensor data is augmented with one or more objects to generate augmented background sensor data. In embodiments, the augmenting the background sensor data includes a sub-step 322 of determining a pose of the target sensor and a sub-step 324 of determining an orientation and/or position of the one or more objects based on the sensor pose. The sub-steps 320-322 are discussed with respect to an embodiment in which the target sensor is a camera, although it will be appreciated that this discussion and its teachings are applicable to other sensor technologies, as discussed herein.

In sub-step 322, the camera pose of the target camera is determined, which provides camera rotation and translation in a world coordinate system so that the graphical objects may be correctly, precisely, and/or accurately rendered onto the background image.

Figure 8:
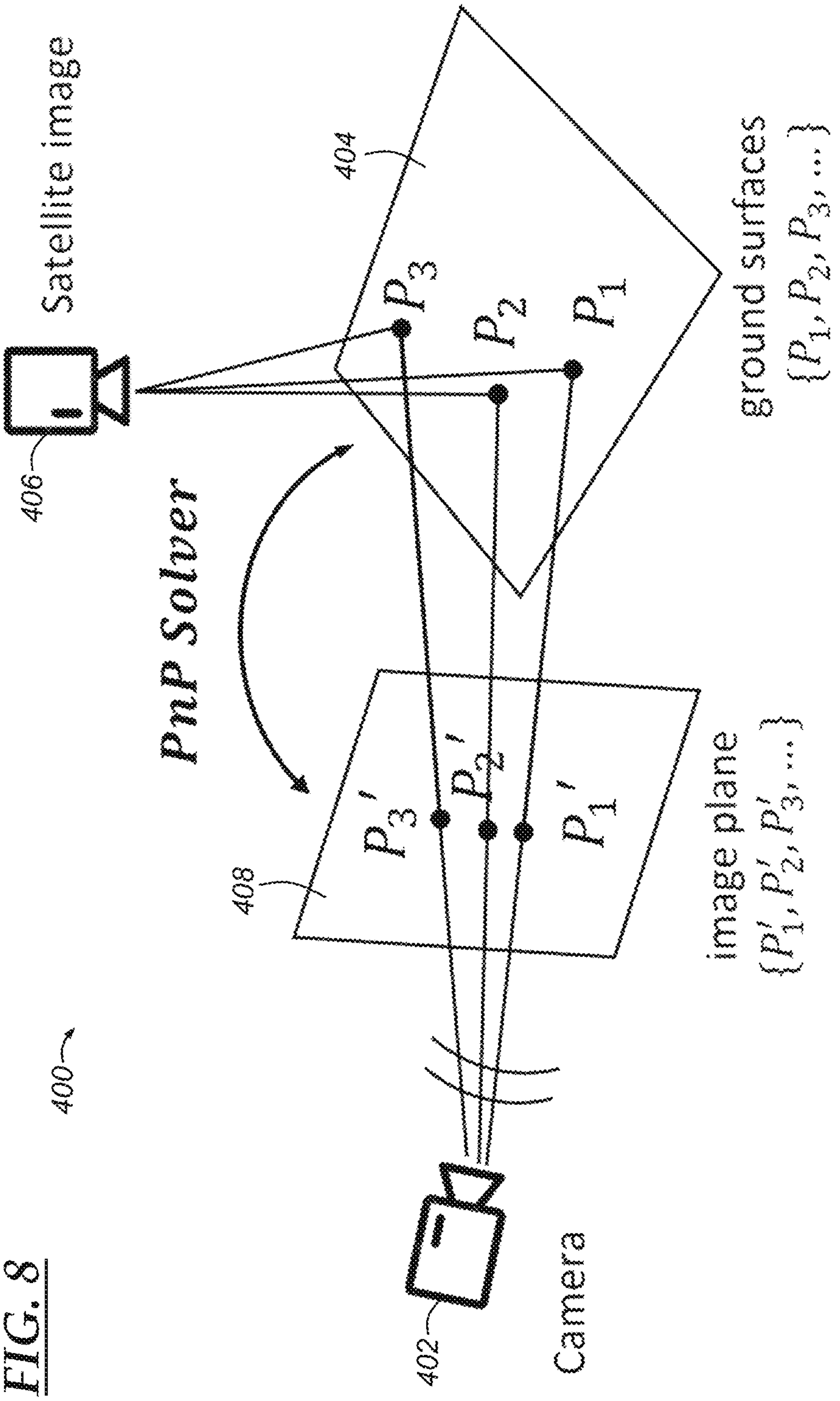
FIG. 8 is a schematic diagram depicting an overview of a camera pose estimation process that is used for the method of FIG. 7, according to one embodiment.

Many standard or conventional camera extrinsic calibration techniques, such as those using a large checkerboard, require in-field operation by experienced technicians, which complicates the deployment process, especially in large-scale deployment. According to embodiments, a landmark-based camera pose estimation process is used where the camera pose is capable of being obtained without any field operation. FIG. 8 devices an overview of such a camera pose estimation process that may be used; particularly, FIG. 8 depicts a target camera 402 that captures image data of ground surface 404. A satellite camera 406 is also shown and is directed so that the satellite camera 406 captures image data of the ground surface or plane 404. According to embodiments, including the depicted embodiment of FIG. 8, the camera pose estimation process considers a set of landmarks that are observable by the target camera 402 and the satellite camera 406; in particular, each landmark of the set of landmarks is observable by the satellite camera 406 at points $P_1$, $P_2$, $P_3$ on the ground surface or plane 404 and each landmark of this set is also observable by the target camera 402 at points $P_1'$, $P_2'$, $P_3'$ on an image plane 408. In embodiments, a perspective-n-point (PnP) technique is used where a PnP solver uses n pairs of the world-to-image correspondences obtained by these landmarks. E. Marchand, H. Uchiyama, and F. Spindler, "Pose estimation for augmented reality: a hands-on survey," IEEE transactions on visualization and computer graphics, vol. 22, no. 12, pp. 2633-2651, 2015. Based on the PnP technique, homography data providing a correspondence between the image plane and the ground plane is determined. The homography data may be used to determine a location/position and orientation of the target camera 402, and may be used to determine geographic locations (3D locations), or at least locations along a ground surface or ground plane 406, based on pixel coordinate locations of an image captured by the target camera. Such a PnP technique for AR may be applied here to determine the appropriate or suitable camera pose. With reference back to FIG. 7, the method 300 continues to step 324.

In sub-step 324, a two-dimensional (2D) representation of the one or more graphical objects is determined based on the camera pose and, in embodiments, the two-dimensional (2D) representation of a graphical object includes the image position of the graphical object, an image size of the graphical object, and/or an image orientation of the graphical object. The image position refers to a position within an image. The image orientation of a graphical object refers to the orientation of the graphical object relative to the camera FOV so that a proper perspective of the graphical object may be rendered according to the determined 3D position of the graphical object in the real-world. In embodiments, the image orientation, the image position, and/or other size/positioning/orientation-related attribute of the graphical object(s) are determined as a part of an AR rendering process that includes using the camera pose information (determined in sub-step 322).

In embodiments, the camera intrinsic parameters or matrix K is known and may be stored in the data repository 20; the extrinsic parameters or matrix [R|T] can be estimated using the camera pose estimation process discussed above. Here, R is a 3×3 rotation matrix and T is a 3×1 translation matrix. For any point in the world coordinate system, the corresponding image pixel location may be determined using a classic camera transformation:

$$Y = K \times [R|T] \times X \qquad \text{Equation (1)}$$

where X is a homogeneous world 3D coordinate of size 4×1, and Y is a homogeneous 2D coordinate of size 3×1. In embodiments, Equation (1) is used both for rendering models onto the image, as well as generating ground-truth labels (annotations) that map each vehicle's bounding box in the image to a geographic location, such as a 3D location. According to embodiments, the AR rendering is performed using Pyrender™, a light-weight AR rendering module for Python™. The method 300 continues to step 330.

In step 330, a sensor-realistic (or photorealistic) image is generated based on the augmented sensor data through use of a domain transfer network. A domain transfer network is a network or model that is used to translate image data between domains, particularly from an initial domain to a target domain, such as from a simulated domain to a real domain. In the present embodiment, the domain transfer network is a generative adversarial network (GAN); however, in other embodiments, the domain transfer network is a Variational Autoencoder (VAE), a Diffusion Model, or a Flow-based model. As discussed above, the AR rendering process generates graphical objects (e.g., vehicles) in the foreground over real background images, and the foreground graphical objects are rendered from 3D models, which may not be realistic enough in visual appearance and may affect the trained detector's real-world performance. According to embodiments, a GAN-based reality enhancement component is applied to convert the AR generated foreground graphical objects (e.g., vehicles) to realistic looks (e.g., realistic vehicle looks). The GAN-based reality enhancement component uses a GAN to generate photorealistic image data. In embodiments, the GAN-based reality enhancement component is used to perform an image-to-image translation of the graphical objects so that the image data representing the graphical objects is mapped to a target domain corresponds to a realistic image style; in particular, an image-to-image translation is performed in which the structure (including physical size, position, orientation) is maintained while appearance, such as surface and edge detail and color, is modified according to the target domain so as to take on a photorealistic style. The GAN includes a generative network that generates output image data and an adversarial network that evaluates the output image data to determine adversarial loss. In embodiments, a Contrastive Unpaired Translation (CUT) is applied to translate the AR-generated foreground to the realistic image style. T. Park, A. A. Efros, R. Zhang, and J.-Y. Zhu, "Contrastive learning for unpaired image-to-image translation," in European conference on computer vision. Springer, 2020, pp. 319-345. In embodiments, a contrastive learning technique (such as the CUT technique) is performed on input photorealistic vehicle image data in which portions of images corresponding to depictions of vehicles within the photorealistic images of vehicles of the one or more datasets are excised and the excised portions are used for the contrastive learning technique. In embodiments, the contrastive learning technique is used to perform unpaired image-to-image translation that maintains structure of the one or more graphical objects and modifies an image appearance of the one or more graphical objects according to the photorealistic vehicle style domain.

The adversarial loss may be used to encourage output to have a similar visual style (and thus to learn the photorealistic vehicle style domain). In embodiments, the realistic image style (or photorealistic vehicle style domain) is learned from a photorealistic style training process, which may be a photorealistic vehicle style training process that performs training on roadside camera images, such as the 2000 roadside camera images of the BAAI-Vanjee dataset. Further, the photorealistic vehicle style training process may include using a salient object detector, such as TRACER (M. S. Lee, W. Shin, and S. W. Han, "*Tracer: Extreme attention guided salient object tracing network* (*student abstract*)," in Proceedings of the AAAI Conference on Artificial Intelligence, vol. 36, no. 11, 2022, pp. 12 993-12 994), to remove backgrounds of the images so that the CUT model only focuses on translating the vehicle style instead of the background style. The AR-rendered vehicles or objects are translated individually and re-rendered to the same position. The method 300 ends.

Figure 9:
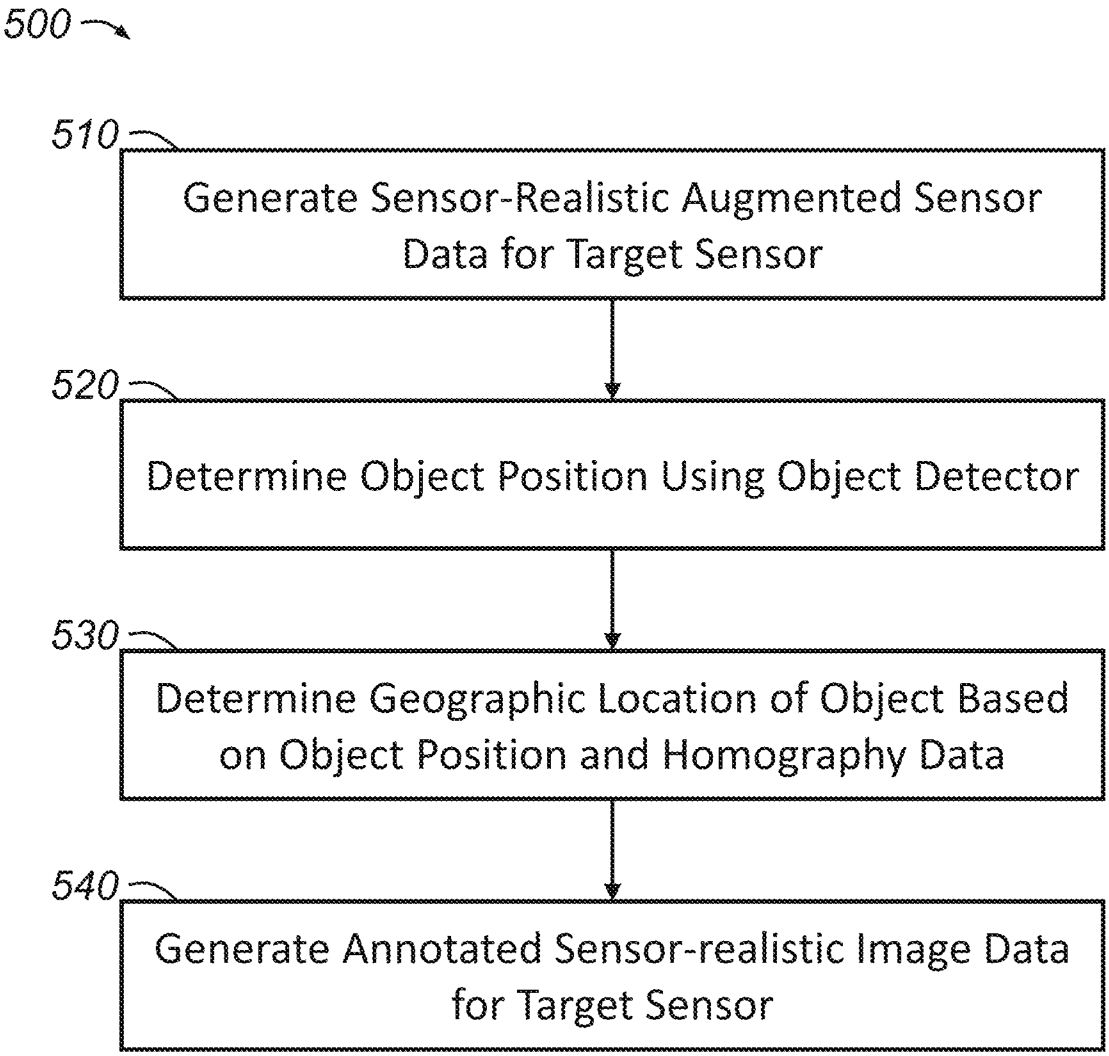
FIG. 9 is a flowchart of a method of generating annotated sensor-realistic (or photorealistic) image data for a target image sensor and for training an object detector configured for use on input images captured by the target image sensor, according to embodiments.

With reference to FIG. 9, there is shown an embodiment of a method 500 of generating annotated sensor-realistic (or photorealistic) image data for a target image sensor and, in embodiments, for training an object detector configured for use on input images captured by the target image sensor. The method 500 begins with step 510, wherein sensor-realistic image data (e.g., photorealistic image data representing a photorealistic image) is generated, such as through the method 300 (FIG. 7) discussed above. In embodiments, as a part of generating the photorealistic image data, a camera pose of the target camera is determined using homography data that provides a correspondence between geographic locations (or a ground plane corresponding to geographic coordinates/locations) and locations within an input image captured by the target camera. The method 500 continues to step 520.

In step 520, an object position of an object is determined by an object detector and, in embodiments, the object is a vehicle and the object position is a vehicle bottom center position. In embodiments, the object detector is a YOLOX™ detector and is configured to detect the vehicle bottom center position as being a central position along a bottom edge of a bounding box that surrounds pixel representing the detected vehicle. The vehicle bottom center position, which here may initially be represented as a pixel coordinate location, is thus obtained as object position data (or, specifically in this embodiment, vehicle position data). The method 500 continues to step 530.

In step 530, a geographic location of the object is determined based on the object position and homography information. In embodiments, the homography information is the homography data as, in such embodiments, the same homography data is used to determine the camera pose of the target camera and the geographic location of objects detected within the camera's FOV (based on a determined pixel object location, for example). In embodiments, the operation 216 is used to perform a pixel to 3D mapping as discussed above, which may include using a homography matrix to determine correspondence between pixel coordinates in images of a target camera and 3D geographic locations in the real world environment within the FOV of the target camera. The method 500 continues to step 540.

In step 540, annotated sensor-realistic (or photorealistic) image data for the target sensor is generated. The annotated photorealistic image data is generated by combining or pairing the photorealistic image with one or more annotations. Each of the one or more annotations indicates detection information about one or more objects, such as one or more mobile objects, detected within the camera's FOV. In embodiments, including the present embodiment, the annotations each indicate a geographic location of the object as determined in step 530. The annotated photorealistic image data is generated and may be stored in the data repository 20 and used for a variety of reasons, such as for training an object detector that is used for detecting objects and providing object location data for objects within the target camera's FOV. The annotations may be used as ground-truth information that informs the training or learning process. The method 500 ends.

Performance Evaluation. The discussion below refers to a performance evaluation used to assess object detector performance based on training an object detector model using different training datasets, including one training dataset comprised of training data having the photorealistic image data generated according to the methods disclosed herein, which is referred to below as the synthesized training dataset.

The target perception computer system evaluated had four cameras located at an intersection with a north camera, a south camera, an cast camera, and a west camera. It should be appreciated that while the discussion below discusses particulars of one implementation of the method and system disclosed herein, the discussion below is purely exemplary for purposes of demonstrating usefulness of the generated photorealistic image data and/or the corresponding or accompanying annotations.

A. Synthesized Training Dataset. The synthesized training dataset contains 4,000 images in total, with 1,000 images being synthesized or generated for each camera view (north, south, east and west). The background images used for the synthesis or generation are captured and sampled from roadside camera clips with 720×480 resolution over 5 days. For the foreground, all kinds of vehicles (cars, buses, trucks, etc.) were considered to be in the same 'vehicle' category.

B. Experiments and Evaluation Dataset Preparation. To thoroughly test the robustness of the proposed perception system, six trials of field tests at Mcity™ in July and August 2022 were performed. In the field tests, vehicles drove through the intersection following traffic and lane rules for at least 15 minutes per trial. In total, more than 20 different vehicles were mobilized for experiments to achieve sufficient diversity. These six trials cover a wide range of environmental diversity including different weather (sunny, cloudy, light raining, heavy raining) and lighting (daytime and nighttime) conditions. Two evaluation datasets were built from the field tests described above: normal condition evaluation dataset and harsh condition evaluation dataset. The normal condition dataset contains 217 images with real vehicles in the intersection during the daytime under good weather conditions. The harsh condition dataset contains 134 images with real vehicles in the intersection under adverse conditions. Fifteen (15) images are under light raining conditions, 39 images are collected at twilight or dusk, 50 images are collected under heavy raining conditions, and 30 images are collected in sunshine after raining conditions.

C. Training Settings. The training pipeline provided by YOLOX was followed, but with some modifications to fit the synthesized dataset. YOLOX-Nano was used as the default model in the experiments. The object detector model was trained for 150 epochs in total with 15 warm-up epochs included, and drop the learning rate by a factor of 10 after 100 epochs. The initial learning rate is set to be 4e-5 and the weight decay is set to be 5e-4. The Adam optimizer is used. The object detector model was trained with a mini-batch size 8 on one NVIDIA RTX 3090 GPU. For data augmentation, the input image is first resized such that the long side is at 640 pixels, and then the short side is padded to 640 pixels. Random horizontal flips were applied with probability 0.5 and a random HSV augmentation is applied with a gain range of [5, 30, 30].

D. Evaluation Metrics. A set of bottom center based evaluation metrics were developed, and these metrics are based on the pixel l2 distance of vehicle bottom centers. First, the center distance between the detected vehicle and ground-truth d is calculated. The distance error tolerance is set to θ, and the detections with d<θ are regarded as true positive detections, and the detections with d≥θ are regarded as false positive detections. The detections are sorted in descending order of confidence scores for the Average Precision (AP) calculation. AP with θ=2, 5, 10, 15, 20, 50 pixels, as well as the mean average precision (mAP), are calculated. The following are reported: mAP, AP@20 (AP with θ=20 pixels), AP@50 (AP with θ=50 pixels), and the average recall AR.

E. Baseline Comparison. YOLOX-Nano trained on the synthesized dataset is compared to the same object detector model trained on other datasets, including the general object detection dataset COCO, the vehicle-side perception dataset KITTI, and the roadside perception datasets BAAI-Vanjec and DAIR-V2X. Since the vehicle bottom center position is evaluated, while the following datasets only provide the object bounding box in their 2D annotations, for models trained on COCO, KITTI, BAAI-Vanjee, and DAIR-V2X, a center shift is manually applied to roughly map the predicted vehicle center to vehicle bottom center by $x_{bottom}=x$, $y_{bottom}=y+0.35$ h. Here ($x_{bottom}$, $y_{bottom}$) is the estimated vehicle bottom center after mapping, and the (x, y) is the predicted object center by the detector. Table I shows the comparison between the model trained on the synthesized dataset and on other datasets. The synthesized dataset model (i.e., the model trained on the synthesized data) is pretrained on the COCO dataset and then trained on the synthesized dataset. The model trained on the synthesized dataset outperforms all other datasets on both normal conditions and harsh conditions. On normal conditions, the synthesized dataset model achieves 1.6 mAP improvement and 1.5 AR improvement over the second best model (trained on COCO). On harsh conditions, the synthesized dataset model achieves 6.1 mAP improvement and 1.5 AR improvement over the model trained on COCO. For other datasets, one can see that the models trained on roadside perception datasets (BAAI-Vanjee and DAIR-V2X) are worse than COCO and KITTI on normal conditions. This implies that the roadside perception datasets might have a weaker transfer-ability than general object detection datasets. One possible reason might be the poses of the camera are fixed. On harsh conditions, none of the existing datasets achieve satisfactory performance.

TABLE 1

| Training Dataset | # images | Normal Condition Evaluation mAP | AP@20 | AP@50 | AR |
|---|---|---|---|---|---|
| COCO | 118K | 47.5 | 70.3 | 88.9 | 62.1 |
| KITTI | 8K | 46.4 | 76.2 | 89.5 | 62.8 |
| BAAI-Vanjee | 2K | 42.5 | 65.3 | 84.9 | 62.6 |
| DAIR-V2X | 7K | 39.7 | 60.1 | 71.6 | 60.1 |
| Set Disclosed Herein | 4K | 49.1 | 78.0 | 92.4 | 63.6 |

| Training Dataset | # images | Harsh Condition Evaluation mAP | AP@20 | AP@50 | AR |
|---|---|---|---|---|---|
| COCO | 118K | 38.3 | 54.4 | 85.2 | 57.6 |
| KITTI | 8K | 33.6 | 54.7 | 75.8 | 53.6 |
| BAAI-Vanjee | 2K | 34.7 | 48.7 | 80.6 | 57.2 |
| DAIR-V2X | 7K | 34.1 | 51.0 | 62.4 | 54.3 |
| Set Disclosed Herein | 4K | 44.4 | 72.1 | 89.8 | 59.1 |

Comparison of model trained on the synthesized dataset disclosed herein to models on other existing datasets. The model trained on the disclosed dataset achieves the best performance on both normal and harsh conditions.

F. Ablation Study. Subsections 1-3. below form part of this Ablation Study section.

1. Analysis on components. In this study, two components in the data synthesis were analyzed: GAN-based reality enhancement (RE) and diverse backgrounds. As shown in Table II, four settings are compared: augmented reality (AR) only with single background, AR only with diverse backgrounds, AR+RE with single background, and AR+RE with diverse backgrounds. Based on AR only, applying diverse backgrounds improves mAP by 5.3 on normal conditions and by 7.1 on harsh conditions. Compared to AR only with single background, adding RE improves mAP by 8.6 on normal conditions and by 7.3 on harsh conditions. When both equipped with diverse backgrounds and reality enhancement, the performance is further improved by over 5 mAP on normal conditions and 7 mAP on harsh conditions.

TABLE 2

Ablation Study

| Settings: AR | AR + RE | Single bg. | Diverse bg. | Normal Condition Evaluation mAP | AP@20 | AP@50 | AR |
|---|---|---|---|---|---|---|---|
| ✓ | | ✓ | | 34.8 | 63.0 | 84.8 | 54.4 |
| ✓ | | | ✓ | 40.1 | 66.1 | 88.5 | 57.9 |
| | ✓ | ✓ | | 43.4 | 73.4 | 89.1 | 57.4 |
| | ✓ | | ✓ | 49.1 | 78.0 | 92.4 | 63.6 |

| Settings: AR | AR + RE | Single bg. | Diverse bg. | Harsh Condition Evaluation mAP | AP@20 | AP@50 | AR |
|---|---|---|---|---|---|---|---|
| ✓ | | ✓ | | 29.9 | 50.1 | 77.7 | 49.8 |
| ✓ | | | ✓ | 37.0 | 62.7 | 85.8 | 53.9 |
| | ✓ | ✓ | | 37.1 | 64.4 | 82.4 | 54.8 |
| | ✓ | | ✓ | 44.4 | 72.1 | 89.8 | 59.1 |

In the settings, AR in the tables above means to directly use Augmented Reality to render vehicles. AR+RE means to use Augmented Reality with Reality Enhancement for vehicle generation. Single bg. means to use only one single background for dataset generation. Diverse bg. means to use diverse backgrounds for dataset generations.

2. Analysis on diversity of backgrounds. Using diverse backgrounds in image rendering is the key to achieve robust vehicle detection over different lighting conditions and weather conditions. Table III shows the analysis on diversity of backgrounds. Weather diversity (sunny, cloudy, rainy) and time diversity (uniformly sample 20 background images from 8 am to 8 pm) was introduced. Both weather diversity and time diversity improve the detection performance. An interesting finding is that the performance on normal conditions is also greatly improved by the diverse backgrounds.

TABLE 3

Ablation Study on diversity of backgrounds.

| Diversity of backgrounds: Weather diversity | Time diversity | Normal mAP | Normal AR | Harsh mAP | Harsh AR |
|---|---|---|---|---|---|
| ✗ | ✗ | 43.4 | 57.4 | 37.1 | 54.8 |
| ✓ | ✗ | 46.8 | 54.7 | 40.1 | 57.3 |
| ✗ | 1 day, 8 am to 8 pm | 47.4 | 60.3 | 41.8 | 56.8 |
| ✓ | 5 day, 8 am to 8 pm | 49.1 | 63.6 | 44.4 | 59.1 |

Both adding weather diversity and time diversity improves the detection performance on all conditions. Improvement on harsh conditions is more significant.

3. Analysis on pretraining. In Table IV, it is shown that the disclosed method can also benefit from pretraining on existing datasets, at least in embodiments. On normal conditions, pretraining on COCO dataset or KITTI dataset improves the detection performance by over 4 mAP, while pretraining on BAAI-Vanjee or DAIR-V2X dataset shows no significant improvement. One possible reason is that the BAAI-Vanjee dataset and DAIR-V2X dataset are roadside datasets captured in Chinese intersections. The generalization ability to U.S. intersections might be limited. On harsh conditions, pretraining on all datasets shows decent mAP improvement.

TABLE 4

Ablation Study on pretraining.

| Pretrain dataset | Normal mAP | Normal AR | Harsh mAP | Harsh AR |
|---|---|---|---|---|
| — | 43.7 | 63.8 | 34.7 | 60.6 |
| KITTI | 48.2 | 66.2 | 41.6 | 60.4 |
| BAAI-Vanjee | 42.4 | 59.0 | 40.6 | 56.3 |
| DAIR-V2X | 44.8 | 61.7 | 40.3 | 58.1 |
| COCO | 49.1 | 63.6 | 44.4 | 59.1 |

Pretraining on existing datasets improves mAP on both normal conditions and harsh conditions. Here, AR is not improved by pretraining.

G. Conclusion. It can be seen that the performance of the model is improved after tuning on the synthesized dataset, especially the precision under harsh conditions. It has been noticed that the improvement in recall is relatively marginal in most cases. An intuitive explanation for this is that with a large amount background images shuffling in the training dataset, the model will correct those false-positive cases where it sees backgrounds as vehicles. While to improve recall, the model needs to correct those false-negative cases where it classifies vehicles as backgrounds. In the case of the presently disclosed synthesized dataset, the synthesized vehicles in this disclosed dataset still have a gap between the real-world vehicles. While the GAN used in reality enhancement discussed above is trained on only 2000 images from BAAI-Vanjee dataset, after being deployed to the real-world (as part of the Smart Intersection Project (SIP)), the GAN will be trained again with large amounts of real-world data streamed to the camera.

Accordingly, at least in embodiments, the AR domain transfer data synthesis scheme, as discussed above, is introduced to solve the common yet critical data insufficiency challenge encountered by many current roadside vehicle perception systems. At least in embodiments, the synthesized dataset generated according to the system and/or method herein may be used to fine-tune object detectors trained from other datasets and to improve the precision and recall under multiple lighting and weather conditions, yielding a much more robust perception system in an annotation-free manner.

In the discussion above:

BAI-Vanjee refers to Y. Deng, D. Wang, G. Cao, B. Ma, X. Guan, Y. Wang, J. Liu, Y. Fang, and J. Li, "BAAI-VANJEE Roadside Dataset: Towards The Connected Automated Vehicle Highway Technologies In Challenging Environments Of China," CoRR, vol. abs/2105.14370, 2021. [Online]. Available: https://arxiv.org/abs/2105.14370.

COCO refers to T. Lin, M. Maire, S. J. Belongie, J. Hays, P. Perona, D. Ramanan, P. Doll'ar, and C. L. Zitnick, "Microsoft COCO: common objects in context," in Computer Vision-ECCV 2014-13th European Conference, Zurich, Switzerland, Sep. 6-12, 2014, Proceedings, Part V, ser. Lecture Notes in Computer Science, D. J. Fleet, T. Pajdla, B. Schiele, and T. Tuytelaars, Eds., vol. 8693. Springer, 2014, pp. 740-755.

KITTI refers to A. Geiger, P. Lenz, and R. Urtasun, "Are We Ready For Autonomous Driving? The KITTI Vision Benchmark Suite," in Conference on Computer Vision and Pattern Recognition (CVPR), 2012.

DAIR-V2X refers to H. Yu, Y. Luo, M. Shu, Y. Huo, Z. Yang, Y. Shi, Z. Guo, H. Li, X. Hu, J. Yuan, and Z. Nie, "DAIR-V2X: A Largescale Dataset For Vehicle-Infrastructure Cooperative 3d Object Detection," CoRR, vol. abs/2204.05575, 2022. [Online]. Available: https://doi.org/10.48550/arXiv.2204.05575

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of generating sensor-realistic sensor data, comprising the steps of:

obtaining background sensor data from sensor data of a sensor;

augmenting the sensor background data with one or more objects to generate an augmented background sensor output, wherein the augmenting the background sensor data includes determining a two-dimensional (2D) representation of each of the one or more objects based on a pose of the sensor; and generating sensor-realistic augmented sensor data based on the augmented background sensor output through use of a domain transfer network that takes, as input, the augmented background sensor output and generates, as output, the sensor-realistic augmented sensor data, wherein the domain transfer network is used for performing an image-to-image translation of image data representing the one or more objects within the augmented background sensor output to sensor-realistic graphical image data representing the one or more objects as one or more sensor-realistic objects according to a target domain; and wherein the domain transfer network is trained based on photorealistic augmented image data and data annotations corresponding to the photorealistic augmented image data, wherein the data annotations are generated based on vehicle location data.

2. The method of claim 1, further comprising receiving traffic simulation data providing trajectory data for the one or more objects, and determining an orientation and frame position of the one or more objects within the augmented background sensor output based on the trajectory data.

3. The method of claim 1, wherein the augmented background sensor output includes the background sensor data with the one or more objects incorporated therein in a manner that is physically consistent with the background sensor data.

4. The method of claim 3, wherein the orientation and the frame position of each of the one or more objects is determined based on a sensor pose of the sensor, wherein the sensor pose of the sensor is represented by a position and rotation of the sensor, wherein each object of the one or more objects is rendered over and/or incorporated into the background sensor data as a part of the augmented background sensor data output, and wherein the two-dimensional (2D) representation of each object of the objects is determined based on a three-dimensional (3D) model representing the object and the sensor pose.

5. The method of claim 4, wherein the sensor-realistic graphical image data includes photorealistic renderings of one or more graphical objects, each of which is one of the one or more objects.

6. The method of claim 4, wherein the sensor is a camera, and the sensor pose of the camera is determined by a point-n-perspective (PnP) technique.

7. The method of claim 4, wherein homography data is generated as a part of determining the sensor pose of the sensor, and wherein the homography data provides a correspondence between sensor data coordinates within a sensor data frame of the sensor and geographic locations of a real-world environment shown within a field of view (FOV) of the sensor.

8. The method of claim 7, wherein the homography data is used to determine a geographic location of at least one object of the one or more objects based on a frame location of the at least one object.

9. The method of claim 8, wherein the sensor is a camera and at least one of the objects is a graphical object, and wherein the graphical object includes a vehicle and the frame location of the vehicle corresponds to a pixel location of a vehicle bottom center position of the vehicle.

10. The method of claim 1, wherein the target sensor is an image sensor, and wherein the sensor-realistic augmented sensor data is photorealistic image data for the image sensor.

11. The method of claim 1, wherein the target domain is a photorealistic vehicle style domain that is generated by performing a contrastive learning technique on one or more datasets having photorealistic images of vehicles.

12. The method of claim 11, wherein the contrastive learning technique is performed on input photorealistic vehicle image data in which portions of images corresponding to depictions of vehicles within the photorealistic images of vehicles of the one or more datasets are excised and the excised portions are used for the contrastive learning technique.

13. The method of claim 11, wherein the contrastive learning technique is used to perform unpaired image-to-image translation that maintains structure of the one or more objects and modifies an appearance of the one or more objects according to the photorealistic vehicle style domain.

14. The method of claim 13, wherein the contrastive learning technique is a contrastive unpaired translation (CUT) technique.

15. The method of claim 1, wherein the domain transfer network is a generative adversarial network (GAN) model that includes a generative network that generates output image data and an adversarial network that evaluates the output image data to determine adversarial loss.

16. The method of claim 15, wherein the GAN model is used for performing the image-to-image translation of the image data representing the one or more objects within the augmented background sensor output to sensor-realistic graphical image data.

17. A data generation computer system, comprising:

at least one processor; and memory storing computer instructions;

wherein the data generation computer system is, upon execution of the computer instructions by the at least one processor, configured to:

obtain background sensor data from sensor data of a sensor;

augment the sensor background data with one or more objects to generate an augmented background sensor output, wherein the augmenting the background sensor data includes determining a two-dimensional (2D) representation of each of the one or more objects based on a pose of the sensor; and generate sensor-realistic augmented sensor data based on the augmented background sensor output through use of a domain transfer network that takes, as input, the augmented background sensor output and generates, as output, the sensor-realistic augmented sensor data, wherein the domain transfer network is used for performing an image-to-image translation of image data representing the one or more objects within the augmented background sensor output to sensor-realistic graphical image data representing the one or more objects as one or more sensor-realistic objects according to a target domain; and wherein the domain transfer network is trained based on photorealistic augmented image data and data annotations corresponding to the photorealistic augmented image data, wherein the data annotations are generated based on vehicle location data.

* * * * *